US009793715B2

(12) United States Patent
Fischer et al.

(10) Patent No.: US 9,793,715 B2
(45) Date of Patent: Oct. 17, 2017

(54) PORTABLE LOAD BALANCING AND SOURCE OPTIMIZATION

(71) Applicant: Honeywell International Inc., Morristown, NJ (US)

(72) Inventors: Scott Fischer, Peoria, AZ (US); J. Rick Martin, Rio Rancho, NM (US); Gregory Brainard, Rio Rancho, NM (US); Robert Harris, Raleigh, NC (US); Jonathan Gray Tugwell, Raleigh, NC (US)

(73) Assignee: Honeywell International Inc., Morris Plains, NJ (US)

( * ) Notice: Subject to any disclaimer, the term of this patent is extended or adjusted under 35 U.S.C. 154(b) by 504 days.

(21) Appl. No.: 14/469,261

(22) Filed: Aug. 26, 2014

(65) Prior Publication Data

US 2016/0064932 A1 Mar. 3, 2016

(51) Int. Cl.

| H02H 3/00 | (2006.01) |
|---|---|
| H02J 3/26 | (2006.01) |
| H02J 3/38 | (2006.01) |
| H02J 3/46 | (2006.01) |
| H01H 51/00 | (2006.01) |
| B60L 11/08 | (2006.01) |

(52) U.S. Cl.
CPC ............ *H02J 3/26* (2013.01); *H02J 3/381* (2013.01); *H02J 3/46* (2013.01); *B60L 11/08* (2013.01); *H01H 51/005* (2013.01); *Y02E 40/50* (2013.01)

(58) Field of Classification Search
USPC .................. 307/18; 361/42, 86–87
See application file for complete search history.

(56) References Cited

U.S. PATENT DOCUMENTS

| 6,066,932 A * | 5/2000 | Fetzer ............... H02H 7/097 318/280 |
|---|---|---|
| 8,315,745 B2 | 11/2012 | Creed |
| 8,415,830 B2 | 4/2013 | Lim et al. |
| 2004/0021371 A1 | 2/2004 | Jouper |
| 2005/0225909 A1 * | 10/2005 | Yoshizaki ......... H01H 83/144 361/42 |

(Continued)

OTHER PUBLICATIONS

"Hybrid-Intelligent Power, Hi-Power", RDECOM, CERDEC, NextEnergy, http://www.nist.gov/pml/high_megawatt/upload/Holcomb-2.pdf, 23 pgs. Date Accessed: May 27, 2013.

(Continued)

*Primary Examiner* — Danny Nguyen
(74) *Attorney, Agent, or Firm* — Brooks, Cameron & Huebsch, PLLC

(57) ABSTRACT

Methods, systems, and devices for portable load balancing and source optimization are described herein. One portable load balancing and source optimization system, includes one or more electric generators that supply three phase electrical power, at least one sensor to sense whether the three phases have become unbalanced beyond a threshold amount, a set of contactors that enable the contacts of the three phases to be changed to adjust the balance of the three phases, and a controller to determine which reversible contactors of the set of contactors to change to adjust that balance of the three phases based on information from the sensor.

15 Claims, 10 Drawing Sheets

(56) References Cited

U.S. PATENT DOCUMENTS

| | | | | |
|---|---|---|---|---|
| 2008/0111429 A1* | 5/2008 | Rowell | ............... | H02H 11/004 |
| | | | | 307/127 |
| 2012/0056436 A1 | 3/2012 | Russell et al. | | |
| 2015/0180327 A1* | 6/2015 | Matsuda | ............. | H02H 7/0805 |
| | | | | 323/212 |

OTHER PUBLICATIONS

"Intelligent Power Management Distribution Systems (IPMDS)", U.S. Army Research, Development and Engineering Command. http://www.dtic.mil/ndia/2011power/Session2_12093_Whitmore.pdf. Apr. 2011, 28 pgs.

"Tactical Micro Grid Controller", Energy Technologies, Inc. http://www.tacticalsheltersystems.com/tactical_micro_grid_controller.php. 2 pgs. Date Accessed: May 24, 2013.

"GSmart", EFACEC. http://www.efacec.pt/PresentationLayer/ResourcesUser/Catalogos%202012/Automa%C3%A7%C3%A3o/as74i0903e1_GSmart_EN.pdf. 8 pgs. Date Accessed: May 27, 2013.

"CM-MPN Automatic Phase Sequence Correction, Saves S$", ABB. http://www.abb.co.in/cawp/seitp202/10724e5bfaae1fe4c12576d2006c9173.aspx. 3 pgs. Date Accessed: May 27, 2013.

* cited by examiner

PORTABLE LOAD BALANCING AND SOURCE OPTIMIZATION

TECHNICAL FIELD

The present disclosure relates to methods, systems, and devices for portable load balancing and source optimization.

BACKGROUND

In order to provide power to remote areas of the battlefield found in countries such as Iraq and Afghanistan when a military force is fighting in a remote area, generators must be used to provide this power. In order to run the generators, they may utilize diesel fuel or other fossil fuel in order to generate electricity.

To get the fuel to the generators, the fuel may have to be airlifted or placed in a truck that must convoy to the outpost. This may place service men and women in harm's way and may, ultimately, sacrifice the lives of service men and women.

Additionally, when used in an application, such as a movie set in a remote area, the cost of these systems may be the actual price of burdened fuel and the transportation cost of getting the fuel to the location. This causes the effective price of fuel in a remote area to cost much more than a gallon or liter of fuel in a non-remote area.

DETAILED DESCRIPTION

Figure 1:
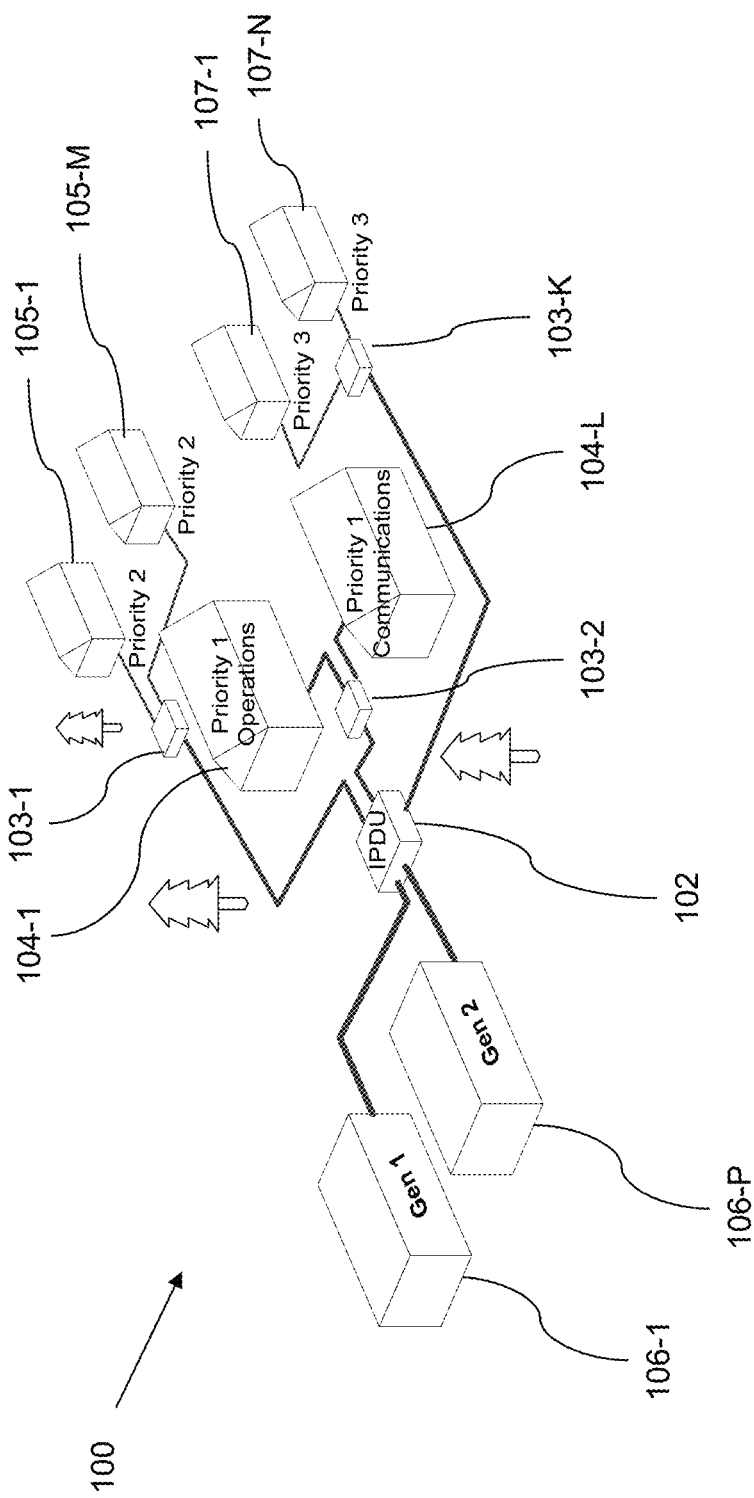
FIG. 1 illustrates a system for portable load balancing and source optimization in accordance with one or more embodiments of the present disclosure.

Methods, systems, and devices for portable load balancing and source optimization are described herein. Embodiments of the present disclosure can provide improvements in safety, reliability, and/or efficiency and can provide these benefits in a hand portable device that provides control of multiple generators from a centralized unit that works to coordinate the usage of the generators to provide the above benefits.

Features of the embodiments of the present disclosure can include one or more of: fault monitoring, isolation, automatic phase balancing, load prioritization, and load shedding and load restoration for a microgrid of one or more generators, among other features as discussed further herein. As used herein, a "microgrid" is an electrical system that includes multiple loads from one or more distributed energy resources that can be operated in conjunction with the broader utility grid or as an electrical island. Some benefits of embodiments of the present disclosure include significant fuel savings, improved power reliability, less stress on individual power resources, and reduced power resource (e.g., generator) run hours, among other benefits.

As discussed above, in order to provide power to remote areas diesel fuel or other fossil fuels may be utilized in order to generate electricity. However, the human and/or financial costs may be high in doing so. Another problem in combat zones is that generators are routinely run unloaded or with partial loads. This can cause increased maintenance to the one or more generators.

Further, another byproduct of some microgrid applications is that most individuals are not focusing on how well the power is distributed. This can result in generators that are unbalanced. This also causes them to burn more fuel, and in extreme cases, can cause damage to the generator and potentially it can go offline.

Additionally, the inability to maintain a stable grid can be problematic. For instance, while operating in an outpost scenario with as few as one or two generators, it can be easy to overload a generator and cause it to shut down, thereby crashing the power grid.

Embodiments of the present disclosure can allow loads to be individually shut off, e.g., by priorities or by utilizing the commander's intent or other thresholds or criteria, to address this problem. By intelligently managing the loads, power surety can be maximized.

For example, in one load balancing and source optimization system embodiment, the system includes, an electric generator that supplies a three phase electrical power, at least one sensor to sense whether the three phases have become unbalanced beyond a threshold amount, a set of contactors that enable the contacts of the three phases to be changed to adjust the balance of the three phases, and a controller to determine which contactors of the set of contactors to change to adjust that balance of the three phases based on information from the sensor.

In some embodiments, the adjustment of the three phases is accomplished by the controller by utilizing a phase rotation to address generator unbalances. The system can include one or more sensors to determine the load being supplied by the generator and a controller for controlling the load supplied by the generator based on information from the sensor. In some implementations, the system includes one or more sensors and each sensor is used to determine the load being supplied by the generator and wherein the controller controls the power generated by each of the generators based on information from all of the sensors.

The controller can be used to provide a number of functions. The controller can also be utilized to use the information from the sensors to control when a generator is to begin providing power or to cease providing power.

For example, in one embodiment, a portable load balancing and source optimization system, includes one or more generators that each generate a three phase electrical power, at least one sensor to sense one or more criteria each having a threshold amount, a controller to determine at least one of: whether the three phases need to be balanced, whether one or more loads on the system need to be shed, whether one or more loads on the system needs to be restored, whether one or more generators need to be started, whether one or more generators need to be stopped, and control logic to take an action based on the determination.

In such an embodiment, a criterion can be any suitable criterion to be evaluated to determine whether one of the items provided above should be undertaken. Example criterion include; a system load being over a threshold amount or a system load being below a threshold amount, or the phases of the system being out of balance.

In such an embodiment, an action to be taken can be any suitable action that should be undertaken to balance load or optimize one or more sources. An example action can, for example, be wherein when one of the one or more criteria is a system load being over a threshold amount it is determined that one or more generators has to be started. Another example action can be wherein when one of the one or more criteria is a system load being below a threshold amount it is determined that one or more generators has to be stopped. Other embodiment and features will be discussed in more detail below.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. The use of the letters "K", "L", "M", and "N" after an element number are used herein to indicate that the number of elements can be any positive number.

As used herein, "a" or "a number of" something can refer to one or more such things. For example, "a number of spray units" can refer to one or more spray units.

FIG. 1 illustrates a system for portable load balancing and source optimization in accordance with one or more embodiments of the present disclosure. The system 100 of FIG. 1 includes an intelligent power distribution unit (IPDU) 102 which can act as a load manager and/or source optimization device connected to generators 106-1 and 106-P, respectively.

FIG. 1 also includes a number of locations in which loads can be present and these load locations have been prioritized a Priority 1 (104-1 . . . 104-L), Priority 2 (105-1 . . . 105-M), and Priority 3 (107-1 . . . 107-N). In this example, priority 1 are the most critical loads on the system, priority 2 are second most critical, and priority 3 are third most critical (in this example, least critical). As illustrated in FIG. 1, in some embodiments, the system can have these load locations connected to the generators 106-1 . . . 106-P via the IPDU 102 and a number of power distribution devices 103-1, 103-2, . . . 103-K that distribute power to one or more outputs that, for example, may have a smaller current rating than their input. Such devices can also distribute three phase power to single phase power.

As illustrated in FIG. 1, the device 102 is compact and hand portable due to its small form factor and light weight (e.g., as compared to the generators). Such a small form factor and light weight allow for the device to easily be moved from one microgrid to another and can enable the device to be connected to legacy equipment that may have been moved into place with heavy machinery, but where the machinery is no longer available.

Such embodiments provide hand portable load manager and source optimizer concepts that address all of the challenges above. As used herein, the term "hand portable" means having a weight that allows the device to be carried by a human. For example, in the United States, a hand potable device can be determined by standardized maximum design weight limits (e.g., Military Standard (MIL-STD)-1472F, 5.9.11.3.3) which allows for six males to carry a 492 pound load.

Accordingly, a suitable device could weigh less than 200 pounds which would make it capable of being moved by one or two humans rather than having to be lifted by heavy machinery, such as a fork lift or other machinery. In some embodiments, the device could weigh less than 492 pounds and would be capable of being moved by six or less humans or less than 265 pounds and would be capable of being moved by four males under the U.S. Military Standard above.

The ability to provide a device with so much functionality without use of heavy machinery will be a significant benefit to users of the device. As used herein, a hand portable device means one that conforms to the above standard for maximum weight limit.

As discussed herein, load management and source optimization can, for instance, be accomplished by intelligently managing the sources. For example, this can be accomplished by using existing generators, turning them on and off only when needed, and using the existing controls for the generators to synchronize them and bring them onto the grid, when necessary.

This can, for instance, happen automatically (e.g., using software, firmware, hardware, or a combination of these), thereby reducing the manpower required to monitor the power system. This also reduces fuel consumption because the generators are being used to best match the load on the system.

Embodiments of the present disclosure also have the ability to load balance or phase shift the loads. This can be accomplished, for example, by having the system perform a calculation and determine the amount of unbalance on the system. If the system exceeds, for example, a pre-programmed threshold, the system can perform a balance operation.

The balance operation, can be selected, for example, depending on the output, to shift the load for ABC to BCA or ABC to CAB. These two phase shifts/rotations can be used to keep the three phase rotation going, for example, in a clockwise fashion. As is understood in the art, if the rotation is not maintained, this could damage three phase motors by causing them to suddenly reverse direction.

In various embodiments, the executable instructions for analyzing and performing the phase balancing can find the best approach to reconfigure the phase balance across the system. Once it is determined that a change should be made, the system then makes the corrections.

The correction can, for example, be made by using motor reversing contactors. The reversing contactors can be wired, for example, to perform the shifts ABC to BCA or ABC to CAB, as discussed in more detail below.

The phase balancing functionality can be executed per a preset schedule (e.g., defined using executable instructions and a processor for executing those instructions wherein the schedule has been predefined by the manufacturer or set by a user prior to use of the device). The phase balancing functionality can also be executed in response to phase balance being measured beyond a preset threshold (e.g., which also can be defined using executable instructions and a processor for executing those instructions wherein the one or more threshold parameters has been predefined by the manufacturer or set by a user prior to use of the device), and/or manually initiated by a user.

In some embodiments, the system can analyze an unbalanced condition of the system and determine whether to adjust a phase arrangement: from ABC to BCA, from ABC to CAB, or to not make any adjustment. Unbalanced phases, for example, in a wye three-phase distribution system can cause very high neutral currents. As the phases become unbalanced, sources, like generators, can have mechanical trouble trying to maintain the imbalance.

Conversely, when phases are balanced, neutral currents approach zero and the generator runs more efficiently. This is because the armatures of the generator are generating close to equal phase currents and shaft torque is more constant. High neutral currents also can present a potential safety hazard as large neutral currents in an unbalanced system can even cause a neutral conductor to fail.

In example embodiments, (e.g., 20 kW, 30 kW, 100 kW) each generator has three single phase outputs. It was determined that by alternating rotations down the outputs (e.g., starting at a first 60 A output), phases could be balanced in all scenarios. The following table shows an example of the possible rotations for each output. It should be noted that the rotation (i.e., clockwise or counterclockwise) of each output was not modified.

Example Output Rotation

| Output | Rotation |
| --- | --- |
| 3 phase 60 A Output 1 | ABC or BCA |
| 3 phase 60 A Output 2 | ABC or CAB |
| 3 phase 60 A Output 3 | ABC or BCA |
| 3 phase 60 A Output 4 | ABC or CAB |
| 3 phase 30 A Output 1 | ABC or BCA |
| 3 phase 30 A Output 2 | ABC or CAB |
| 3 phase 20 A Output 1 | ABC or BCA |
| 3 phase 20 A Output 2 | ABC or CAB |

The above rotation can be achieved, by utilizing three phase reversing contactors to perform the phase rotations that result in improved or optimized phase balance. Each set of reversing contactors has both states of ABC and BCA or ABC and CAB. Only one contactor in each set can be closed at a time. In some embodiments, these contactors will be mechanically, electrically, and/or software interlocked from ever closing in on each other. The following figures are examples, of how the rotations can be performed.

Figure 2A:
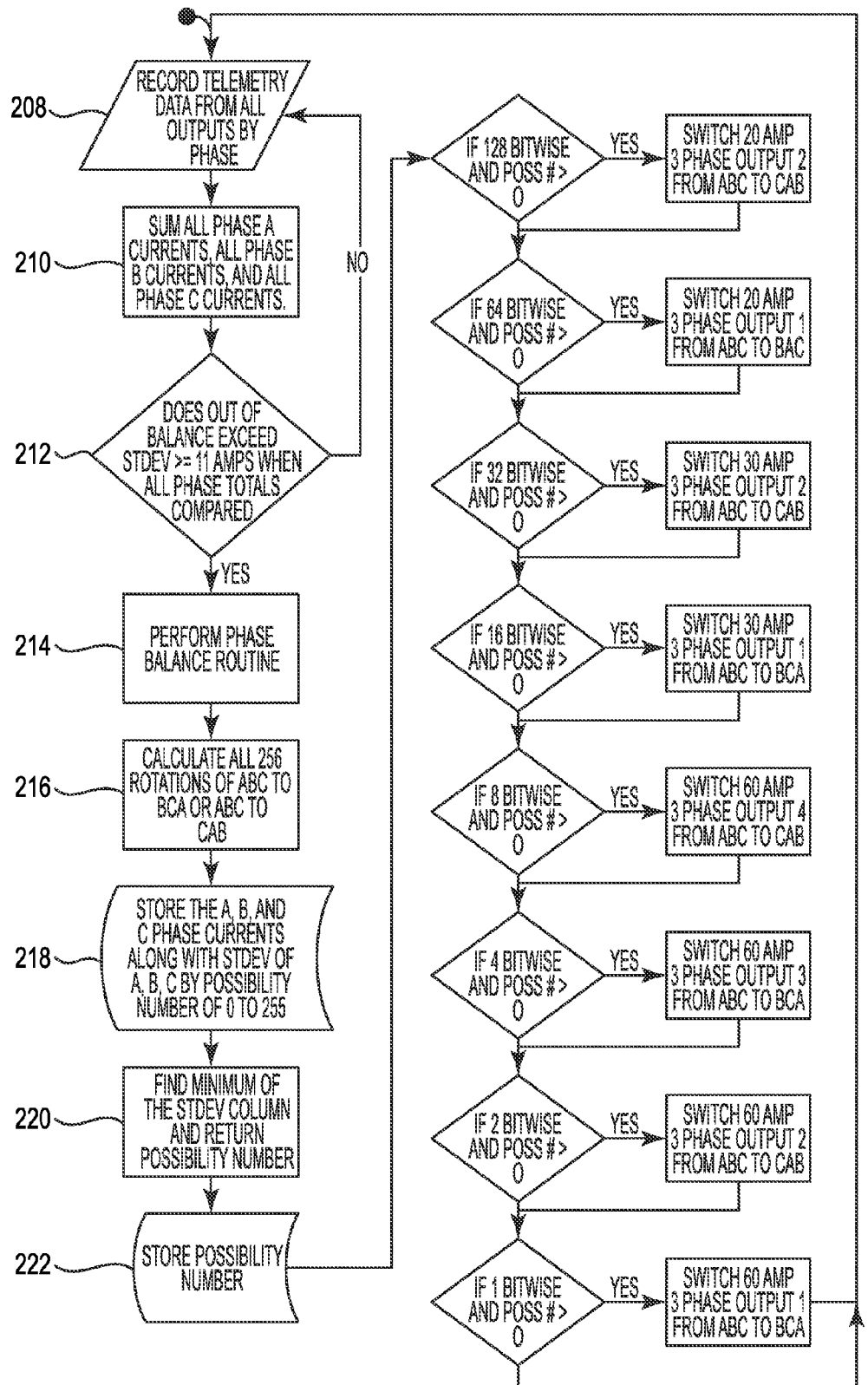
FIG. 2A illustrates a phase balancing flow chart in accordance with one or more embodiments of the present disclosure.
Figure 2B:
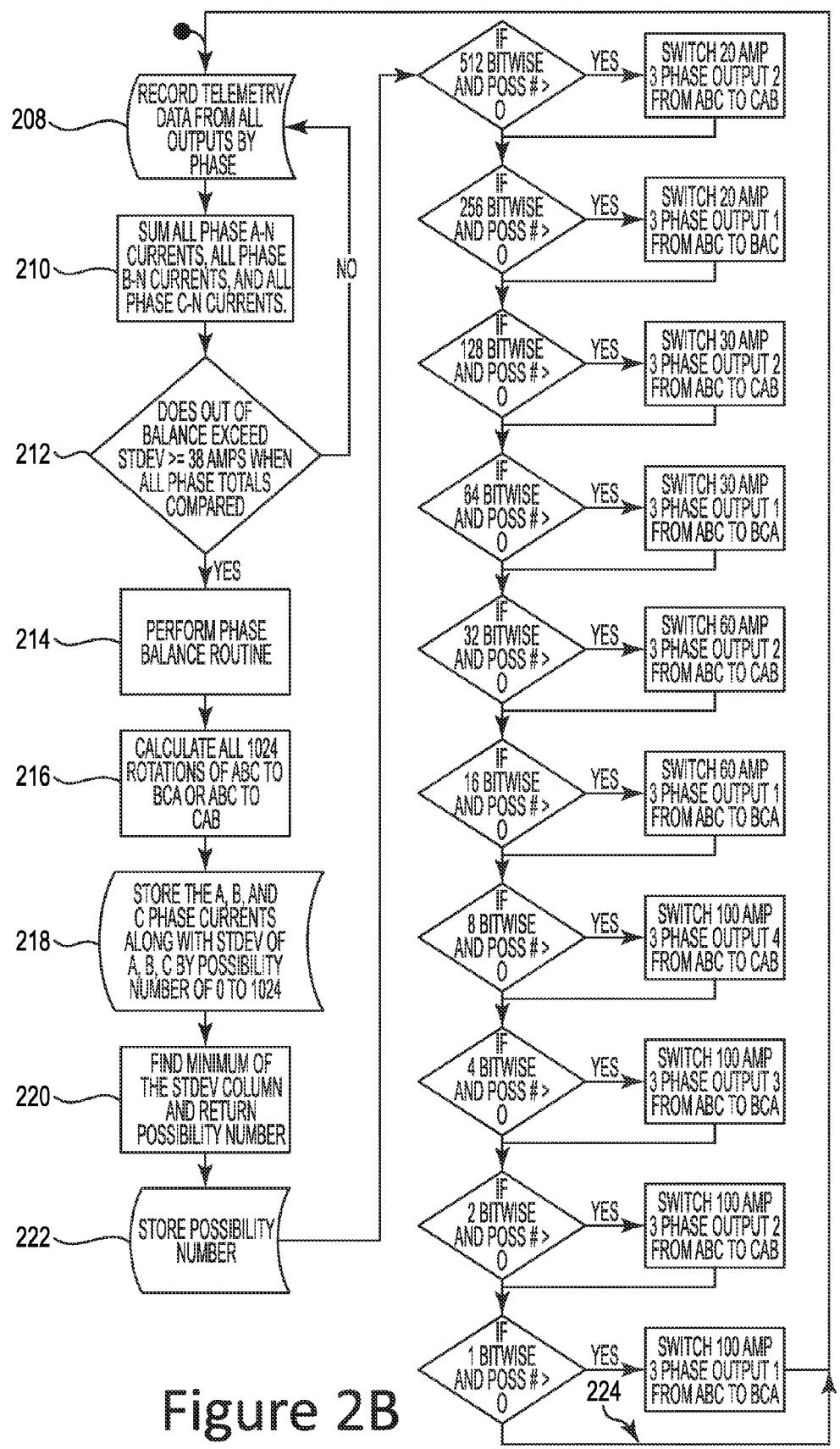
FIG. 2B illustrates another phase balancing flow chart in accordance with one or more embodiments of the present disclosure.

FIGS. 2A and 2B illustrate two phase balancing flow charts in accordance with one or more embodiments of the present disclosure. In FIG. 2A, the illustration represents a 30 kW phase balancing process and FIG. 2B represents a 100 kW phase balancing process. In such embodiments, the process can include recording telemetry data (e.g., load and phase information) from the outputs, for example, by phase as illustrated at 208.

The currents can then be summed (e.g., by phase), for example to assist in the calculation of the amount of phase unbalance between system phases A, B, C at 210. Executable instructions can then be utilized to determine whether a phase unbalance exists that is above a threshold (e.g., 11 amps) at 212.

For example, if the result of the calculation is above a phase rotation threshold, the system determines for more than two loads what a phase rotation sequence will be to get the system in balance given a number of loads currently being served by the system by determining one or more rotation solutions by taking individual phase currents of phases A, B, and C on each load and comparing them in one or more un-rotated or rotated possibilities. For instance, all loads in each possibility by phases A, B, and C can be summed to determine a rotation solution value, and selecting a particular rotation solution that has the lowest rotation solution value.

In some embodiments, the calculation can sum all loads in each possibility by phases A, B, and C to determine a rotation solution value, and selecting a particular rotation solution that has the lowest rotation solution value. As shown in the processes of FIGS. 2A and 2B, in some embodiments, the particular rotation solution value can be used to determine one or more loads to be rotated.

A phase balancing routine can then be executed, if it is determined that an above threshold phase unbalance is present in the system at 214. The system can then calculate the rotations to make the necessary adjustment to the phases to reduce or eliminate the unbalancing at 216.

At 218 in the process of FIGS. 2A and 2B, the A, B, and C phase currents can then be stored in memory along with other information (e.g., the standard deviation (stdev) of A, B, and C by possibility numbers 0 to 255), among other information that may be beneficial in accomplishing load balancing or source optimization. In an embodiment such as those shown in FIGS. 2A and 2B, the possibility number can be converted to a binary format and then, by performing a bitwise ANDing operation utilizing the binary format particular rotation solution, a determination of whether or not to rotate one or more loads can be obtained.

A minimum of the standard deviation can be found and a possibility number determine via executable instructions, such as is illustrated at 220. The possibility number can then be stored at 222. A process can then be followed to determine which phases to adjust in order to change the phase balance. One such process is shown in FIG. 2A at 224 where executable instructions can be utilized to determine whether to switch a phase or not (e.g., whether or not to switch a 20 amp, 30 amp, or 60 amp output). Another similar process is shown at 224 in FIG. 2B. In this example, there are more amp outputs (e.g., 20 amp, 30 amp, 60 amp, and 100 amp).

Figure 3:
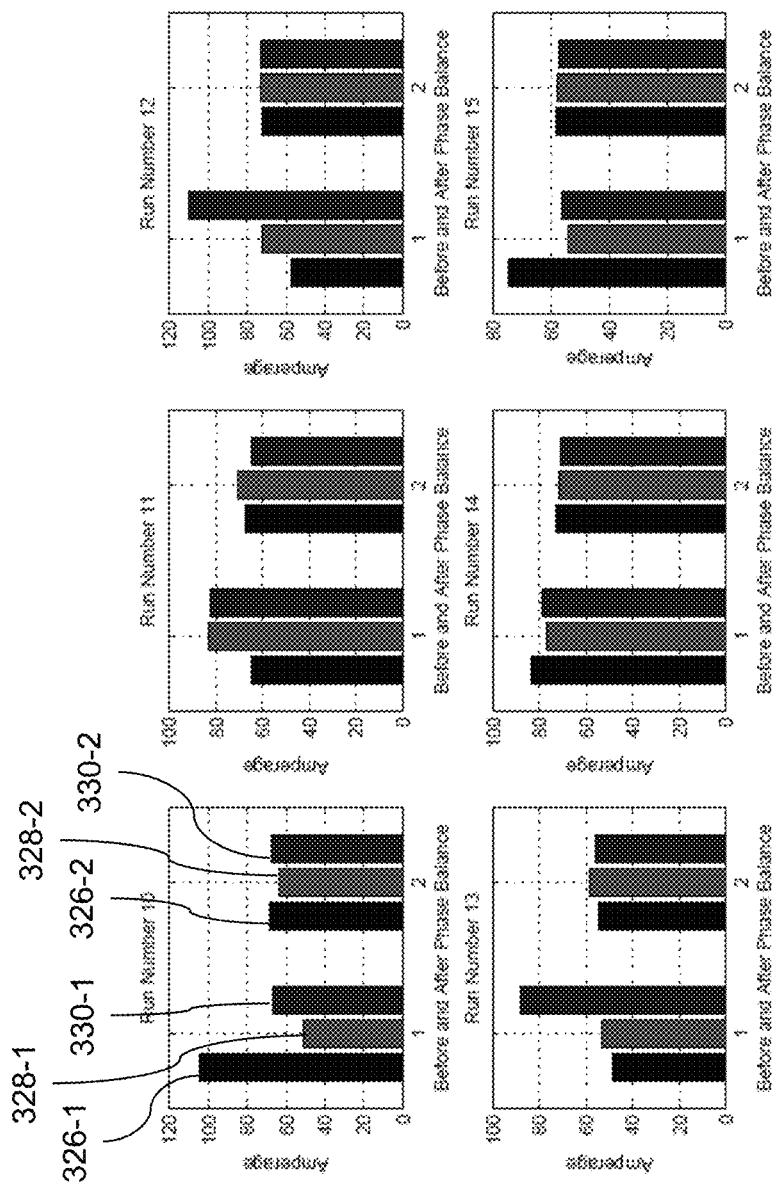
FIG. 3 illustrates six examples of the phases of a system before and after phase balancing conducted utilizing an embodiment of the present disclosure.

FIG. 3 illustrates six examples of the phases of a system before and after phase balancing conducted utilizing an embodiment of the present disclosure. In the upper left example, an original 3 phase load is illustrated by 326-1, 328-1, and 330-1 representing the different loads, A, B, and C. The loads after load balancing as performed by an embodiment of the present disclosure is presented by 326-2, 328-2, and 330-2 representing the different loads, A, B, and C. As can be discerned by looking at these different charts, it is evident that the balancing processes discussed herein can result in an improvement or elimination of unbalancing of the phases.

Figure 4A:
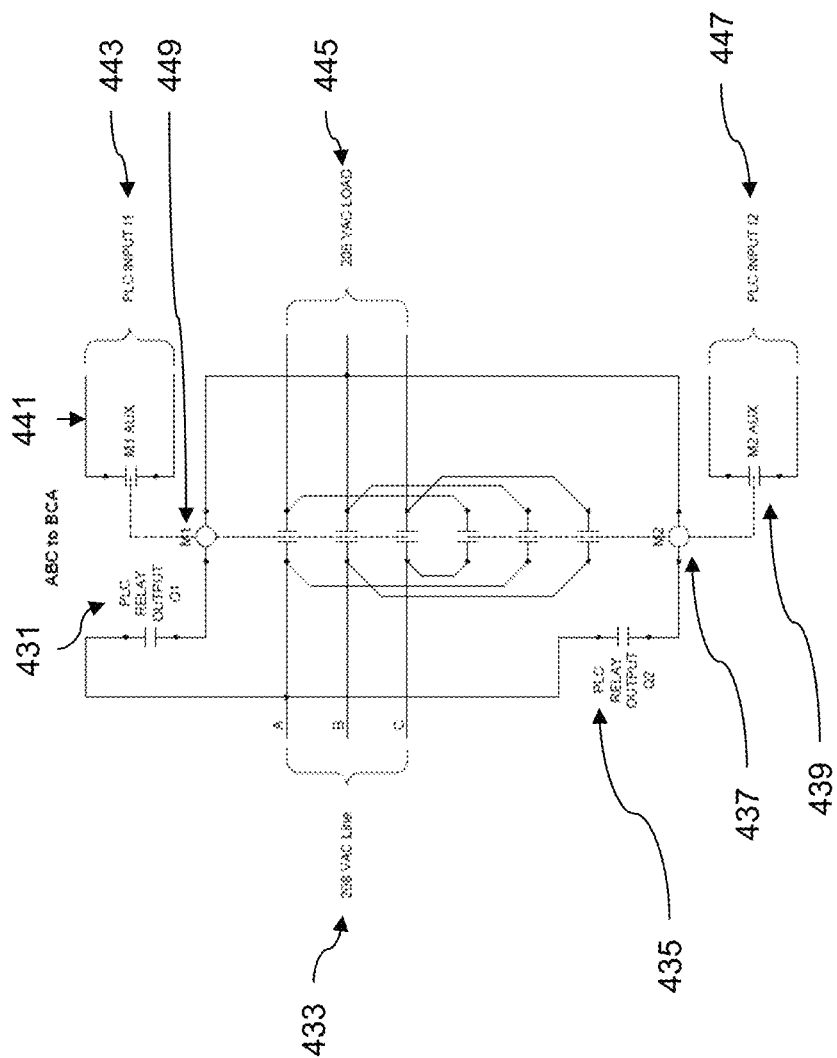
FIG. 4A illustrates a circuit for switching a load from an ABC phase arrangement to a BCA phase arrangement that can be used with embodiments of the present disclosure.

FIG. 4A illustrates a circuit for switching a load from an ABC phase arrangement to a BCA phase arrangement that can be used with embodiments of the present disclosure. FIG. 4A shows an ABC-to-BCA rotation scheme. If ABC was selected, a processor (e.g., microcontroller and/or a programmable logic controller (PLC)) would ensure M2 AUX contact 439 was open prior to trying to close the M1 contactor 449. Once the M1 contactor 449 is closed, the M1 AUX contact 441 closes, signifying that the M1 contactor 449 is closed.

If the microcontroller commands the PLC to change the rotation to BCA, the PLC will send (via PLC input 443) the command to open the M1 contactor 449. Once the PLC receives (via PLC output 431) an affirmative status that M1 AUX 441 is open, the PLC can command (via input 447) the M2 contactor 437 to close. When the contactor is closed the M2 AUX 439 will close, telling the PLC (via output 435) that the M2 contactor 437 is closed, this will then allow power to flow from ABC to BCA at 433 and 445.

Figure 4B:
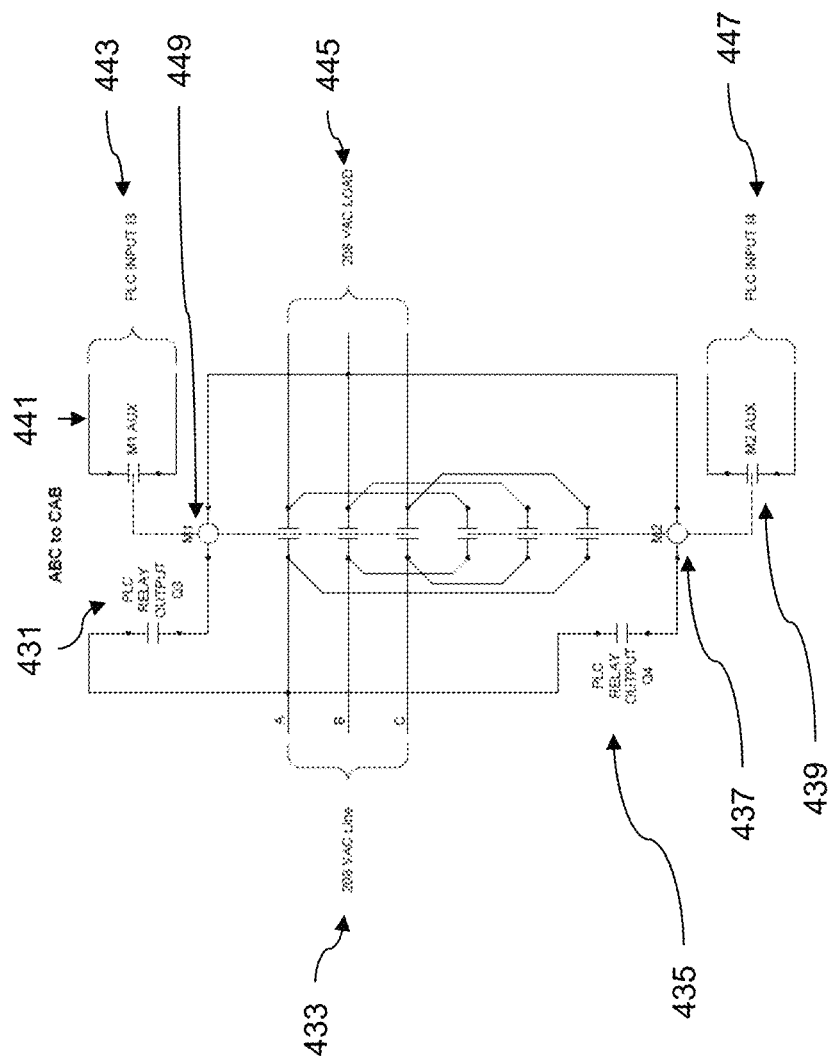
FIG. 4B illustrates a circuit for switching a load from an ABC phase arrangement to a CAB phase arrangement that can be used with embodiments of the present disclosure.

FIG. 4B illustrates a circuit for switching a load from an ABC phase arrangement to a CAB phase arrangement that can be used with embodiments of the present disclosure. FIG. 4B shows an ABC-to-CAB rotation scheme.

FIG. 4B similarly provides a process wherein, if ABC was selected, a processor (e.g., microcontroller and/or a programmable logic controller (PLC)) would ensure M2 AUX contact 439 was open prior to trying to close the M1 contactor 449. Once the M1 contactor 449 is closed, the M1 AUX contact 441 closes, signifying that the M1 contactor 449 is closed.

If the microcontroller commands the PLC to change the rotation to CAB, the PLC will send (via PLC input 443) the command to open the M1 contactor 449. Once the PLC receives (via PLC output 431) an affirmative status that M1 AUX 441 is open, the PLC can command (via input 447) the M2 contactor 437 to close. When the contactor is closed the M2 AUX 439 will close, telling the PLC (via output 435) that the M2 contactor 437 is closed, this will then allow power to flow from ABC to CAB at 433 and 445.

It is believed that there is no known method to make this rotation changeover without a very brief open transition. However, through use of embodiments of the present disclosure, the changeover can be accomplished relatively quickly (e.g., 100 milliseconds (ms) or less which may equate to, for example, 6 cycles or less).

Such changeover speeds are fast enough that most electronics will easily ride through the interruption. In some instances, there may be a barely perceptible flicker; however, users will be generally unaware that the auto phase balancing occurred. Provided in the table below is an example of a process flow for achieving this changeover.

| Max Time 30 kW (ms) | Time (ms) | Comments |
| --- | --- | --- |
| Command Opening | negligible | Negligible (sub-microseconds (ms)) |
| Opening | 19 | Must assume from first attempt to open to receiving status that the contactor is open that the load has been interrupted. |
| Receive Status Open | 5 | Set PLC to 1 ms response on input. Also assume AUX contact takes 5 ms to update. |
| Send command close | 15 | It can take a max of 15 ms for the PLC to fire and output |

-continued

| Max Time 30 kW (ms) | Time (ms) | Comments |
| --- | --- | --- |
| Command Closing | 26 | Example closing time from the reversing contactors selected. |
| | 65 | Total Time (ms) |

In various embodiments, the shifts happen fast enough to not affect downstream loads. This capability does not currently exist in the market.

Another aspect of embodiments of the present disclosure is the concept of load shed and restoration of the system. In some embodiments, a system can shed loads and restore them when required in order to maintain power to the grid.

These loads can, for example, be managed by priorities that a user can set. When the system reaches a shed threshold, the system sheds a load. In some such embodiments, the load shed event will occur until the system reaches equilibrium. If conditions improve and the load can be brought back online, the system will automatically bring the load back. Current portable systems do not have the ability to dynamically shed and restore loads.

Embodiments of the present disclosure can also work in other fields of use. For example, embodiments can be used for natural disaster response, or other situations, when most individuals are not keeping track of balancing their loads and optimizing generation.

As witnessed in previous natural disasters, fuel becomes a premium in these areas. Embodiments of the present disclosure can puts all of the above functions into one system and can run autonomously. Market research indicates that there is no other system like this. In addition to portable applications, embodiments can also be used in a fixed application, if desired.

Embodiments of the present disclosure can be utilized as "drop in" system enhancer that can be designed specifically to efficiently manage legacy temporary electrical power generation and distribution systems to decrease fuel consumption and power generation requirements. System attributes can, for example, include:

Operating the hand portable device with single or multiple legacy tactical quiet generators (TQGs) and/or legacy power distribution equipment (e.g., Power Distribution Illumination Systems, Electrical (PDISE) and Mobile Electric Power Distribution Systems—Replacement (MEPDIS-R) boxes). In some embodiments, the system can feed multiple Environmental Control Unit (ECU) Power Distribution Boxes "BOO boxes", plus multiple outputs (e.g., 3×60 kW, 3×30 kW and 3×20 kW outputs).

As discussed above, some embodiments can automatically command each generator to start and stop based on the best combination for the measured loads. Embodiments can shut off lower priority outputs, when sources are not sufficient, to prevent overload situations that could shut down the entire grid.

Embodiments can be equipped with a touch screen or rugged laptop connected, for example, with an Ethernet cable, to provide "at the box" or remote management of the system, rather than at each generator.

This allows programming and/or control of each connected item remotely from the item itself and from a centralized location, such that a user can program and/or control multiple connected items. With such functionality, the device can be used with non-fossil fuel based items, such as solar arrays, wind turbines, and other device types.

Embodiments of the present disclosure can provide a load restore routine can bring the loads back once the load on the system drops. In such embodiments, the load restore routine can be automatic and therefore, there is no need to shed a load and require user intervention to restore.

An unmanned system can perform this function much faster and with a greater degree of precision than a human operator. Embodiments of the present disclosure utilize a load restore routine to restore the loads when conditions on the system are favorable to restore the load. The reason that the act of shed and restore can be performed quickly and autonomously is because there are contactors on every load which can be switched on and off by the PLC when commanded by a microcontroller.

This can be accomplished by having the current load shed and restore executable instructions utilize a load calculator that continuously determines whether the used load on the system is exceeding a threshold (e.g., 90%) of the capacity. One such load calculator can be seen in FIG. 5.

Figure 5:
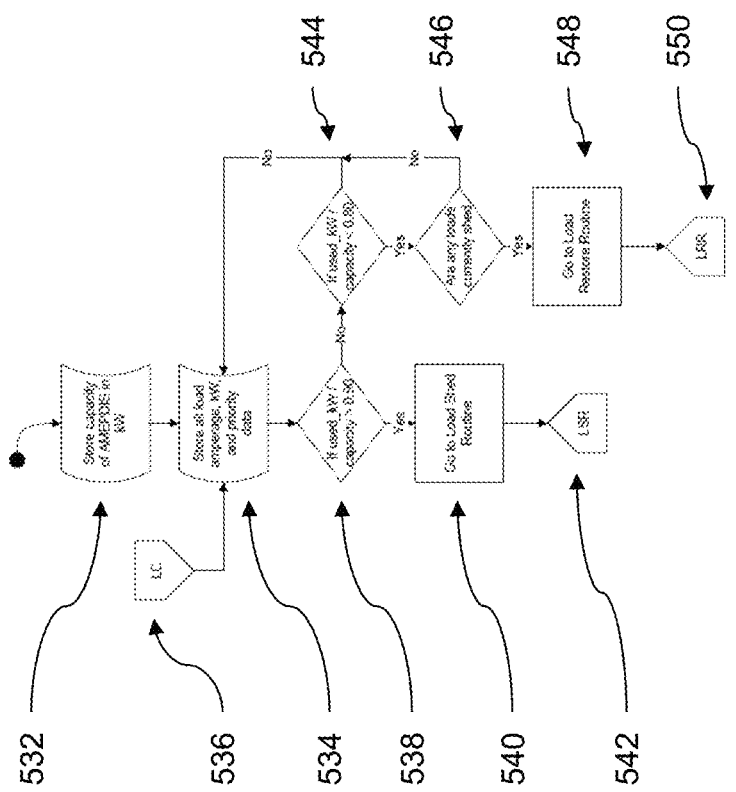
FIG. 5 illustrates a load calculator flow chart that can be used with embodiments of the present disclosure.

FIG. 5 illustrates a load calculator flow chart that can be used with embodiments of the present disclosure. In some embodiments, once it is determined that the load shed set point has been exceeded, the system will begin to shed loads starting at Priority 5, then 4, then 3, and then 2. Critical loads (i.e., Priority 1 loads can be set to never be shed).

For instance, in the example in FIG. 5, the capacity of the grid can be stored in memory at 532. Information such as the load amperage, kW, and priority data, can also be stored in memory at 534 and used by the load calculator (LC) 536 to make load calculations.

For example, in various embodiments, the kW value going out on the load prior to being shed can be stored, and a bit signifying the specific load has been shed can be set to true. In this manner, the system can keep track of what loads have been shed and what the load amounts where prior to being shed, which can aid in maintaining the system and potentially in restoring loads.

At 538, the calculator can determine whether the system has reached a load threshold (e.g., greater than 90% (if used kW capacity>0.90). If it determines that threshold has been exceeded, then the executable instructions can proceed (at 540) to a load shed routine (at 542), such as the example described in FIG. 6.

In the above example, the 90% value could be input as the load shed set point. This value can be user configurable, in some embodiments.

If it determines that threshold has not been exceeded, then in some embodiments, the executable instructions can proceed to calculate whether a lower threshold has been met (e.g., less than 80% (if used kW capacity<0.80), at 544. If the lower threshold has been met, then executable instructions check data (e.g., sensor data and/or data stored in memory) to determine if any loads have been shed, at 546. If loads have been shed, executable instructions can proceed (at 548) to a load restore routine (at 550), such as the example described in FIG. 7.

In the above example, the 80% value could be input as the load restore set point. This value can be user configurable, in some embodiments.

Figure 6:
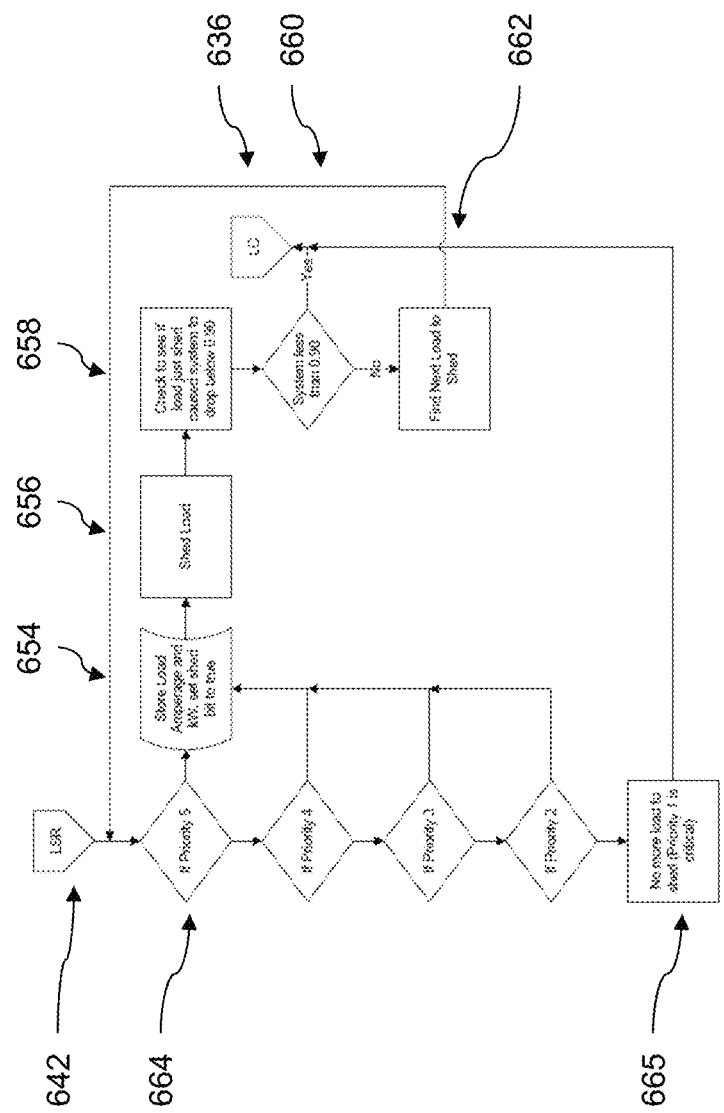
FIG. 6 illustrates a load shed routine flow chart that can be used with embodiments of the present disclosure.

FIG. 6 illustrates a load shed routine flow chart that can be used with embodiments of the present disclosure. In the example of FIG. 6, the load shed routine (LSR) 642 begins by analyzing whether lowest priority loads should be shed, at 664. The priorities can be established by a user of the system, by the manufacturer of the system, or by a system administrator or system designer, among others.

At 654, the system stores information, such as load amperage, kW. In this example a set bit is also set to true. A priority 5 load (the lowest priority available in this example) is then shed at 656. Executable instructions then check data (e.g., sensor data and/or data stored in memory) and use the load calculator 636 to determine if the load just shed caused the system load to drop below a threshold (e.g., 90% from the example in FIG. 5), at 658.

If the threshold has not been met at 660, then the system continues to shed priority 5 loads until there are no more priority 5 loads to shed (e.g., at 662). Then it transitions to shedding priority 4 loads, then priority 3 loads, and so on until either all loads have been shed (except priority 1 loads, which have been deemed critical at 665, in FIG. 6) or the system load has dropped below the threshold. If the system load has dropped below the threshold at 660, then it discontinues the shedding of loads.

Figure 7:
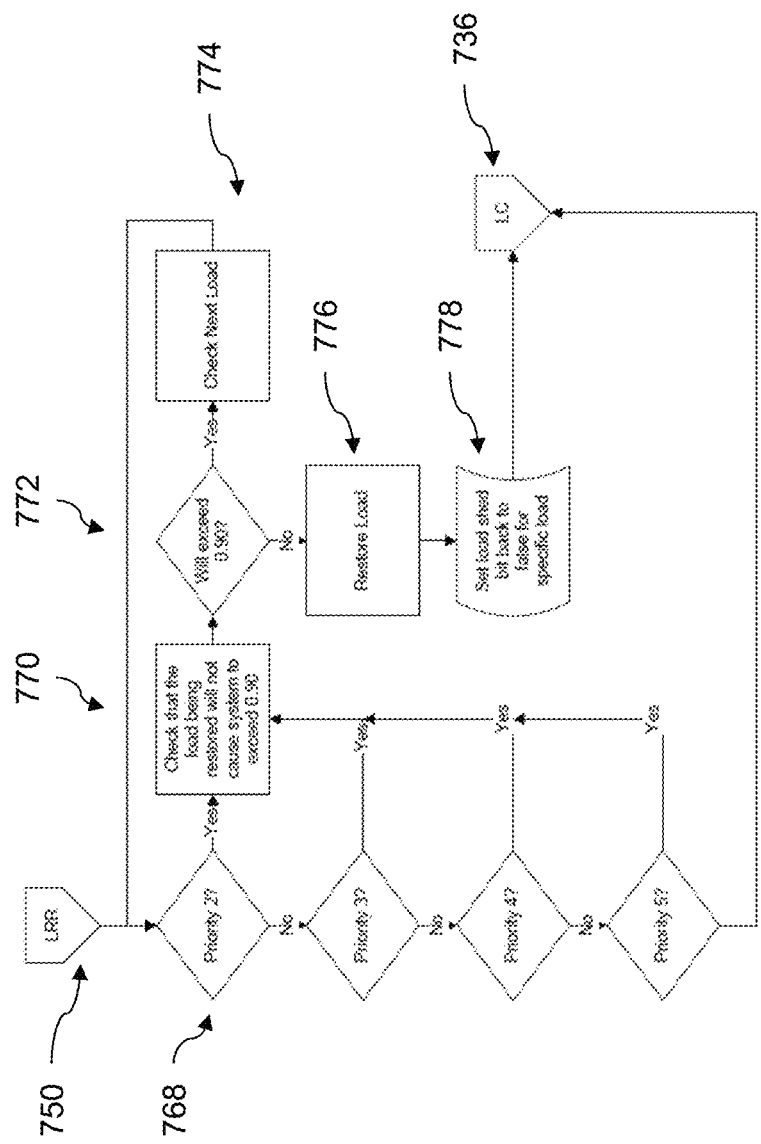
FIG. 7 illustrates a load restore routine flow chart that can be used with embodiments of the present disclosure.

FIG. 7 illustrates a load restore routine flow chart that can be used with embodiments of the present disclosure. In the example illustrated in FIG. 7, the load restore routine 750 can begin to restore the highest priority loads first at 768 (e.g., in the example of FIG. 7, these will be priority 2 loads as all priority 1 loads were not shed as they were deemed critical to system function or set aside for another reason).

Executable instructions then check data at 770 (e.g., data stored in memory regarding the amount of load this item had before it was shed) and use the load calculator 736 to determine if the load being restored will cause the system to exceed a threshold (e.g., the 90% load shed set point from the example in FIG. 5), at 772. If the load will exceed the threshold, then the load will not be restored and the system will look to the next priority 2 load to see if that one will exceed the threshold. Once a load can be found that will not exceed the threshold, then the system will restore the load at 776. In some embodiments, then a load shed bit will be reset to false for the load that has been restored at 778.

The system can continue to restore priority 2 loads until there are no more priority 2 loads to restore. Then it transitions to restoring priority 3 loads, then priority 4 loads, and so on until either all loads have been restored or the system load will exceed the threshold if another load is added.

In some embodiments, a check can be performed (e.g., 770) before a load is restored to ensure that restoring the load will not immediately result in a shed being performed. This optional feature potentially can protect the equipment from unnecessary wear and tear, for example by keeping the energy sources from having an excessive amount of starts and stops.

Figure 8:
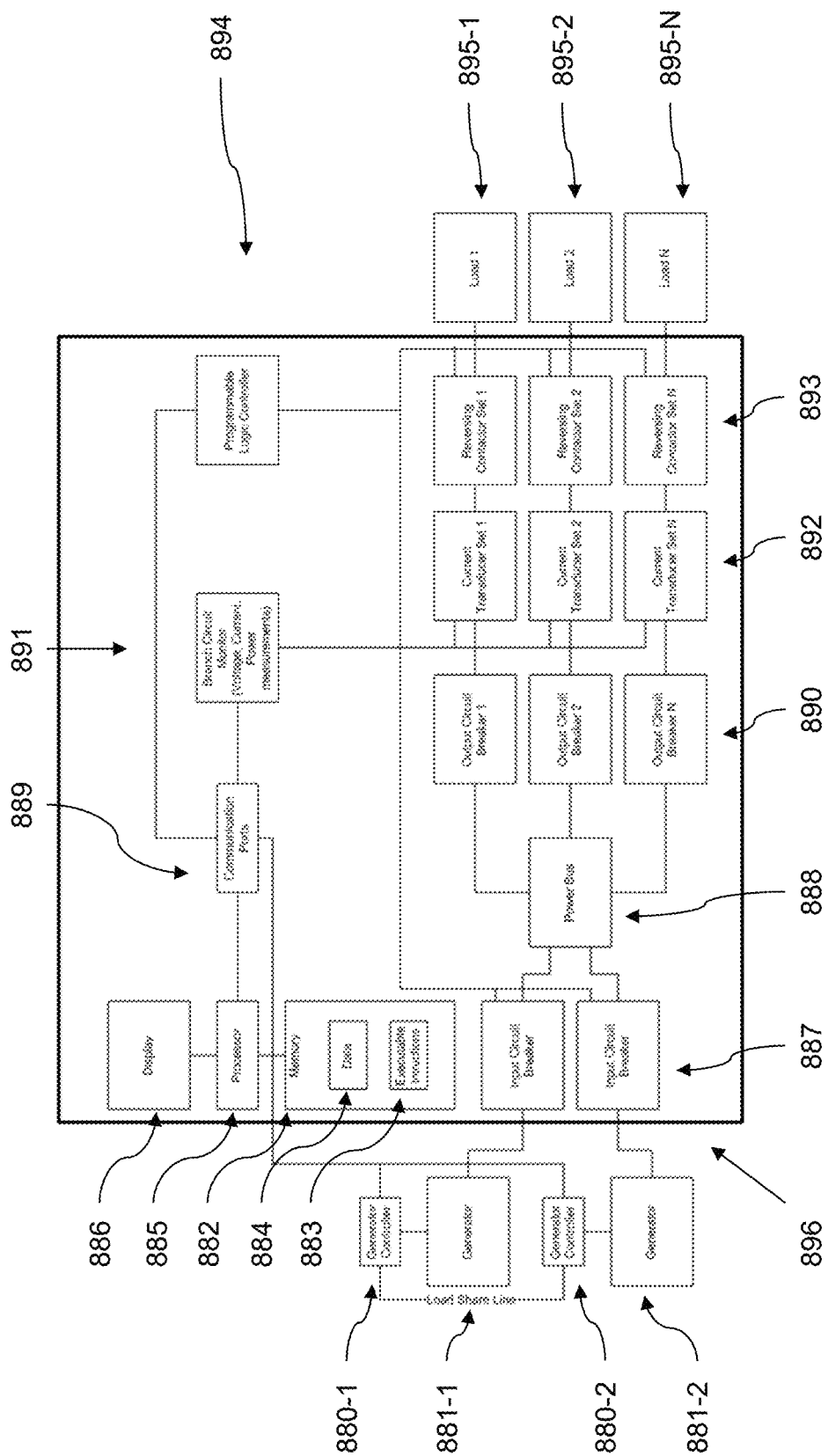
FIG. 8 illustrates a device embodiment according to the present disclosure.

As shown in FIG. 8, system 100 includes a portable load balancing and source optimization device 896 communicatively coupled to multiple generators (e.g., the example of FIG. 8 has two generators, 881-1 and 881-2, but more than two energy sources can be utilized in various embodiments of the present disclosure).

The generators illustrated in the example system embodiment of FIG. 8 each have their own generator controller 880-1 and 880-2, respectively. As discussed herein, the device 896 can be configured to use executable instructions to control a generator directly or work with the generator controller of each generator to share information including generator data, and make the adjustments, shed and/or restore, as discussed herein.

As illustrated in FIG. 8, the device 896 can include a processor 885 configured to execute instructions, and memory 882 having storage therein for data (e.g., generator load sensor data or other information) 884 and executable instructions 883 to be executed by the processor.

The embodiment of FIG. 8 also includes a programmable logic controller (PLC) 894. In some embodiments, the functionality of the PLC and the processor can be accomplished by one component that provides both functionalities.

The device 896 can be a computing device having a memory and a processor, though embodiments of the present disclosure are not so limited. For example, device 896 can include one or more integrated circuits and/or logic to perform a number of the functionalities described herein.

Memory 884 can be any type of storage medium that can be accessed by processor 885 to perform various examples of the present disclosure. For example, memory 884 can be a non-transitory computer readable medium having computer readable instructions (e.g., computer program instructions) stored thereon that are executable by processor 885, for load balancing and/or source optimization, in accordance with one or more embodiments of the present disclosure.

Further, although memory 884 and processor 885 are illustrated as being located in device 896, embodiments of the present disclosure are not so limited. For example, memory 884 and/or processor 885 can also be located internal to another computing resource (e.g., enabling computer readable instructions to be downloaded over the Internet or another wired or wireless connection).

As illustrated in FIG. 8, some embodiments can include a display 886 that can be used to convey information to a user of the device. As used herein, a user can be an operator, an administrator, or a manufacturer that is configuring the system.

In the embodiment of FIG. 8, the device has multiple loads (e.g., 895-1, 895-2, . . . 895-N). These loads can be adjusted by the reversing contactor sets 893 as discussed herein, allowing the phases of the loads to be changed.

The embodiment of FIG. 8 also includes a current transducer set 892 for each load and these sets are monitored by a branch circuit monitor 891 that monitors and provides information to the device such as voltage, current, and power measurements, among other information. This information (and information from other device resources, such as the PLC) can be provided to the processor and memory via one or more communication ports 889.

In some embodiments, the device can include a safety mechanism and/or software executable instructions that enable the contacts of the three phases to be changed to adjust the balance of the three phases without reversing one or more loads.

For example, in various embodiments, the set of contactors can include two three phase contactors and wherein the system analyzes an unbalanced condition of the system and determines if one or more of the loads needs to be rotated and during a transition from one rotation to a next rotation, the system requests that one of the set of contactors currently providing power is open and checks to ensure that the contactor is open, and then closes the other contactor of the set contactors.

One such implementation can include the set of contactors are reversible contacts having a mechanical safety interlock that enables the contacts of the three phases to be changed to adjust the balance of the three phases without reversing the one or more generators. Such embodiments can be beneficial, for example by protecting the system from damage and unnecessary downtime.

Another example provides wherein the set of contactors includes two standard contactors with a software safety interlock that enables the contacts of the three phases to be changed through wiring to adjust the balance of the three phases without reversing one or more loads Input and output ports can be provided with circuit breakers 887 and 890 and powered by a bus 888 in some embodiments. Further, information from the inputs and outputs, transducers and contactors can be provided to one or more of the PLC, branch circuit monitor, or processor to assist in providing the functionalities described herein.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A portable load balancing and source optimization system, comprising:
   one or more electric generators that supply three phase electrical power;
   at least one sensor to sense whether the three phases have become unbalanced beyond a threshold amount;
   a set of contactors that enable the contacts of the three phases to be changed to adjust the balance of the three phases;
   a controller to determine which reversible contactors of the set of contactors to change to adjust that balance of the three phases based on information from the sensor; and
   wherein the system includes one or more sensors and each sensor is used to determine the load being supplied by the generator and wherein the controller controls the power generated by each of the generators based on information from the one or more sensors used to determine the load being supplied by the generator.

2. The system of claim 1, wherein the adjustment of the three phases is accomplished by the controller by utilizing a phase rotation to address generator unbalances.

3. The system of claim 1, wherein the controller uses the information from the sensors to control when a generator is to begin providing power or to cease providing power.

4. The system of claim 1, wherein the set of contactors includes two standard contactors with a software safety interlock that enables the contacts of the three phases to be changed through wiring to adjust the balance of the three phases without reversing one or more loads.

5. A portable load balancing and source optimization system, comprising:
one or more generators that supply a three phase electrical power;
at least one sensor to sense whether the three phases have become unbalanced beyond a threshold amount;
a set of reversible contactors that enable the contacts of the three phases to be changed to adjust the balance of the three phases;
a controller to determine which contactors of the set of contactors to change to adjust that balance of the three phases based on information from the sensor; and
wherein the set of reversible contactors includes a mechanical safety interlock that enables the contacts of the three phases to be changed to adjust the balance of the three phases without reversing the one or more generators.

6. A portable load balancing and source optimization system, comprising:
one or more generators that each generates a three phase electrical power;
at least one sensor to sense one or more criteria each having a threshold amount;
a controller to determine at least one of: whether the three phases need to be balanced, whether one or more loads on the system need to be shed, whether the system needs to be restored, where one or more generators need to be started, whether one or more generators need to be stopped;
control logic to take an action based on the determination;
wherein one of the one or more the criteria is the phases of the system being out of balance; and
wherein the system analyzes an unbalanced condition of the system and determines whether to adjust a phase arrangement: from ABC to BCA, from ABC to CAB, or to not make any adjustment.

7. The system of claim 6, wherein one of the one or more criteria is an amount of load on the system.

8. The system of claim 6, wherein one of the one or more criteria is a system load being over a threshold amount or a system load being below a threshold amount.

9. The system of claim 8, wherein when one of the one or more criteria is a system load being over a threshold amount it is determined that one or more generators has to be started.

10. The system of claim 6, further includes a set of contactors, wherein the set of contactors includes two three phase contactors and wherein the system analyzes an unbalanced condition of the system and determines if one or more of the loads needs to be rotated and during a transition from one rotation to a next rotation, the system requests that one of the set of contactors currently providing power is open and checks to ensure that the contactor is open, and then closes the other contactor of the set contactors.

11. A portable load balancing and source optimization method, comprising:
sensing a total electrical grid system current with at least one sensor;
calculating an amount of unbalance between system phases A, B, and C, if the result of the calculation is above a phase rotation threshold, the system determines for more than two loads what a phase rotation sequence will be to get the system in balance given a number of loads currently being served by the system by determining one or more rotation solutions by taking individual phase currents of phases A, B, and C on each load and comparing them in one or more un-rotated or rotated possibilities.

12. The method of claim 11, wherein the method further includes summing all loads in each possibility by phases A, B, and C to determine a rotation solution value, and selecting a particular rotation solution that has the lowest rotation solution value.

13. The method of claim 11, wherein the particular rotation solution value is used to determine one or more loads to be rotated.

14. The method of claim 11, wherein the method further includes converting the particular rotation solution into a binary format.

15. The method of claim 14, wherein the method further includes performing a bitwise ANDing operation utilizing the binary format particular rotation solution to determine whether or not to rotate one or more loads.

* * * * *